United States Patent [19]

Cloudy

[11] 4,378,873

[45] Apr. 5, 1983

[54] CONTINUOUS LINEAR CHAIN CONVEYOR SYSTEM OPERATING THROUGHOUT MULTIPLE TIERS WITH DUAL SPACED CHAINS MOVING DIRECTLY ATTACHED MULTIPLE ADJACENT TRAYS WHICH LEVEL TO SUPPORT THE CONVEYED PRODUCT

[75] Inventor: Westley R. Cloudy, Edmonds, Wash.

[73] Assignee: Cloudy & Britton Inc., Mountlake Terrace, Wash.

[21] Appl. No.: 192,932

[22] Filed: Oct. 1, 1980

[51] Int. Cl.³ .................. B65G 17/18; B65G 47/94
[52] U.S. Cl. ............................ 198/796; 62/380; 198/800
[58] Field of Search ........... 198/796, 299, 800, 793, 198/802; 62/237, 380

[56] References Cited

U.S. PATENT DOCUMENTS

| | | | |
|---|---|---|---|
| 1,531,847 | 3/1925 | Danforth et al. | 198/798 |
| 1,538,764 | 5/1925 | Wald | 198/796 |
| 2,323,439 | 7/1943 | Adams | 62/237 X |
| 3,395,653 | 8/1968 | Messerly et al. | 198/796 |

Primary Examiner—James G. Smith
Assistant Examiner—Douglas D. Watts
Attorney, Agent, or Firm—Roy E. Mattern, Jr.

[57] ABSTRACT

A continuous linear chain conveyor system operates throughout multiple tiers to transport a product which is being either cooled, frozen, warmed, heated, or dried and requires a retention time within a designated volume. The product is carried by multiple adjacent trays which are directly and pivotally attached on one end to opposite links of dual continuous moving sidechains, which are spaced apart, but otherwise follow identical direction paths. Moreover the chains and sprockets and most of their related components are all standard, available, components. In addition, all the components involved in critical areas of expansion and/or contraction during temperature changes, have similar coefficients of expansion and contraction. In the preferred embodiment, the conveyor trays are loaded with product outside the enclosure where the process is to take place. Remaining level, the trays move up an inclined guide to the top level entry of the compartment for subsequent longitudinal level travel on each tier and level vertical movement between tiers. During linear horizontal movement, the trays are kept level by horizontal supports. During tier changes, the trays are lowered by means of a sprocket arrangement, using standard sprockets identical to the conveyor chain standard sprockets, which allows the trays to remain level but yet firmly pivotally attached to the moving sidechains. The trays exit the compartment from the lowest tier and are then be unloaded.

13 Claims, 14 Drawing Figures

CONTINUOUS LINEAR CHAIN CONVEYOR SYSTEM OPERATING THROUGHOUT MULTIPLE TIERS WITH DUAL SPACED CHAINS MOVING DIRECTLY ATTACHED MULTIPLE ADJACENT TRAYS WHICH LEVEL TO SUPPORT THE CONVEYED PRODUCT

BACKGROUND OF THE INVENTION

With respect to prior arrangements of chain conveyors supporting products throughout multiple tiers within designated volumes of controlled atmospheres, the following prior United States patents are referred to:

In U.S. Pat. No. 3,243,032, issued in 1966, Louis J. Chambon disclosed his apparatus for conveying products throughout different levels. Continuous independent chain conveyors are positioned at each level. Trays are positioned in receivers attached to the chains and are then transferred, between conveyors, down to the next lower independent chain conveyor, using transfer wheels, as the trays remain level to support the product.

In U.S. Pat. No. 2,254,420, issued in 1941, Everett Cleveland disclosed his refrigerating apparatus in which his conveyor chains carry pivotally suspended baskets that in turn hold the product.

In U.S. Pat. No. 3,173,276, issued in 1965, Walter H. Martin disclosed his endless conveyor type freezer for conveying products throughout different levels. Trays are pivotally suspended below dual continuous chains of the conveyor. Refrigerating air flows are circulated transversely to the direction of the conveyor.

In U.S. Pat. No. 3,857,252, issued in 1974, Edward M. Wight disclosed his food product freezing apparatus for conveying products through a controlled temperature volume. A continuous roller chain carries individual plates which are individually and separately mounted in series on the side of this chain. The continuous roller chain moves down an incline, turns around a sprocket and continues moving down another incline, thus repeating this motion throughout the controlled temperature volume. The refrigerating airflow is circulated transversely to the direction of the continuous roller chain.

In U.S. Pat. No. 1,847,956, issued in 1932, Albert Giger disclosed his method of sharp freezing foodstuffs and the means therefor. The foodstuffs are placed in a plurality of shallow covered pans. Lugs on the pans are secured to transverse rods which are in turn secured to spaced conveyor chains. Tracks guide both the moving chains and pans through two processing levels. The brine refrigerant is applied transversely to the motion of the conveyor.

In U.S. Pat. No. 2,267,789, issued in 1941, Chester J. Conn disclosed his apparatus for freezing food products. During part of the conveyor travel the food products were in molds which were secured at each end to a continuous chain necessitating their being turned upside down at the ends of the conveyor. Such motion of the molds was utilized to unload the food products for further processing on another conveyor.

In U.S. Pat. No. 1,795,330, issued in 1931, Alexander Cooke disclosed his freezing apparatus operating essentially on one overall level. Carriers pivotally attached directly to an endless, one level conveyor transported the food products.

In U.S. Pat. No. 3,224,562, issued in 1965, Peter J. Bailey disclosed his conveyor system utilizing continuous spaced chains which raised and lowered containers removably hooked over cross bars, in turn secured to the chains.

In U.S. Pat. No. 2,723,645, issued in 1955, Orlando Garapolo disclosed his apparatus to provide meat with a surface glaze of ice. Spaced continuous conveyor chains carried permanently secured paddles which pushed the meat products through the glazing liquid.

In U.S. Pat. No. 2,923,138, issued in 1960, Wilbur Rollins disclosed his quick freezing apparatus, utilizing vertical layers of independent conveyors provided with foraminous wire mesh belts. The products are dropped from one level to another level. Refrigerating airflows are applied transversely to the motion of the conveyor.

SUMMARY OF THE INVENTION

The continuous linear chain conveyor system operating throughout multiple tiers is both an improved product handling and processing system but is as well a manual labor-saving device. Unlike batch-type blast freezing, for example, the continuous conveyor provides an opportunity for continuous product processing with its attendant lower manpower requirement. Also advantageous to this system is its good circulation pattern of high velocity air around the conveyed product which lowers the required retention time and thus accomplishes the objective more efficiently.

This conveyor system can be constructed in a variety of sizes and configurations to meet differing requirements. In contrast to prior conveyors moving products through multiple tiers of controlled surrounding temperatures, this continuous linear chain conveyor system is composed of standard conveyor components which are all readily available. A minimum number of such standard conveyor components are used, especially in reference to the lowering of the trays, where only one extra pair of like standard sprockets need be installed at each lowering locale. Where necessary, component coefficients of expansion and contraction are similar to prevent problems. By utilizing continuous chains to insure correct timing of all the mechanisms, it is inherently a simple machine. Loading and unloading portions of the conveyor system can be serviced by persons enjoying room temperatures, outside of the severe environment of the designated volume enclosure.

DESCRIPTION OF THE DRAWINGS

The preferred embodiment of the continuous linear chain conveyor system operating throughout multiple tiers in a freezing enclosure is illustrated in the drawings, wherein:

FIGS. 8, 9 and 10 illustrate the tray lowering mechanism at the headstand end of the conveyor.

DESCRIPTION OF THE PREFERRED EMBODIMENT

Figure 1:
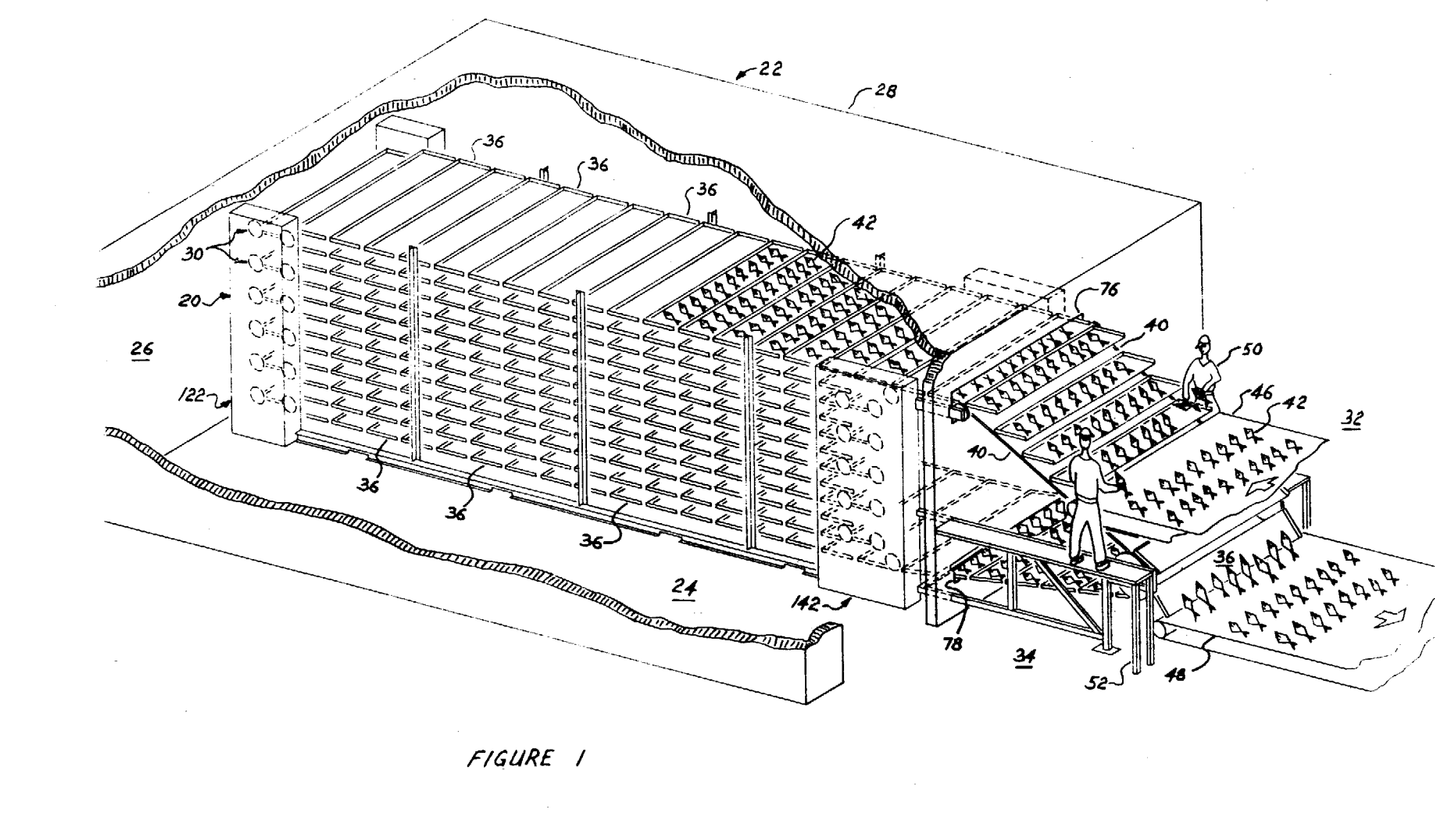
FIG. 1 is an overall isometric view of the conveyor system moving the trays from a loading station outside of the enclosure to the topmost tier, then through various horizontal linear levels, and thereafter outside of the freezing compartment where the trays are tilted to discharge the frozen product for subsequent processing.
Figure 2:
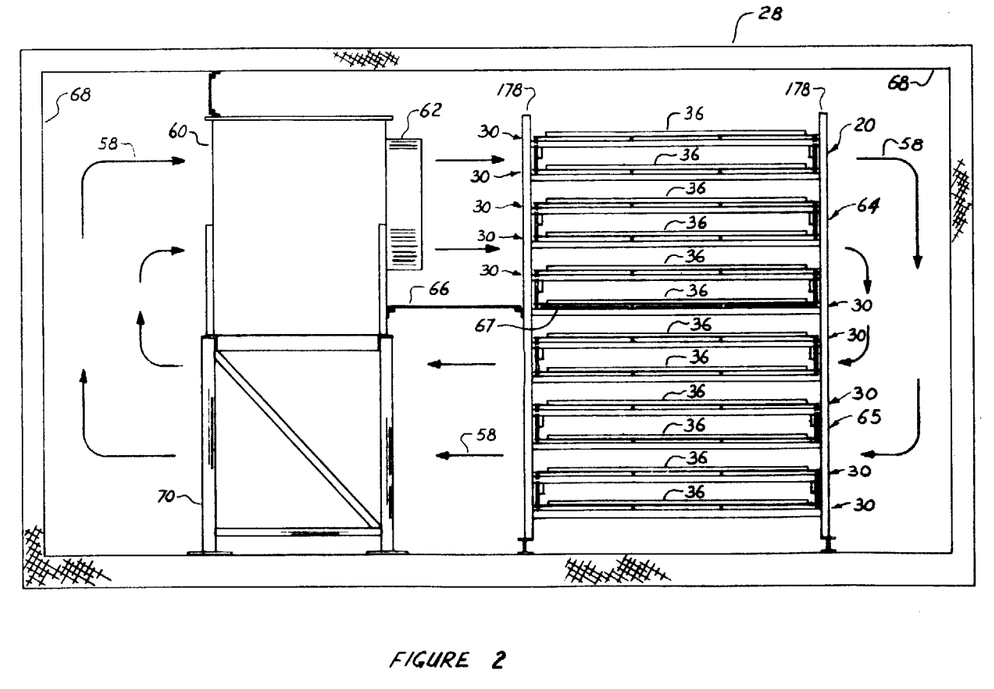
FIG. 2 is an end elevation view of the conveyor as arranged within the freezing compartment together with the freezing equipment. It indicates with arrows the freezing air circulation pattern across the top tiers of moving trays and return through the bottom tiers.

In FIGS. 1 through 14 a preferred embodiment is illustrated of the continuous linear chain conveyor system operating throughout multiple tiers. In FIGS. 1 and 2 this preferred embodiment is shown as installed in conjunction with a designated volume, in particular a freezing volume wherein the product remains for a selected retention time. FIGS. 3 through 14 detail the construction and operation of the conveyor system.

ARRANGEMENT OF THE CONVEYOR WITHIN A FREEZING ENCLOSURE

As particularly illustrated in FIG. 1, the continuous linear chain conveyor 20 can be used in conjunction with a freezing enclosure 28 to constitute overall freezing equipment 22. This conveyor system employing multiple linear tiers 30 can be quite economical of space considerations, especially where floor space 24 is limited and height 26 is not restricted.

Trays 36 attached to dual continuous moving sidechains 40 are manually loaded with product 42, such as fish, furnished from a source such as a loading conveyor 46. The continuously moving trays 36 are advanced in a level fashion into the freezing enclosure 28 and up to the topmost tier of the conveyor 20. From here, the trays 36 proceed linearly to the end of the topmost tier where they are vertically transferred to the next lower tier for subsequent horizontal travel. During the vertical transfer, the trays 36 together with the product 42 remain level. Travel proceeds in this manner on subsequent tiers until after horizontal travel on the lowest tier is complete and the trays 36 exit the freezing enclosure 28 and proceed to the unloading system. At this location the trays 36 are inclined to discharge the product downward to a receiving surface 48, often a discharge conveyor 48.

Persons 50 serving to oversee the loading and unloading section of the conveyor 32 are able to work in areas 34 of normal room temperature, outside of the freezer enclosure 28. These persons 50 are able to use platforms 52 to gain visual and physical access to the higher portions of the loading and unloading conveyor section 32.

CIRCULATION OF HIGH VELOCITY AIRFLOWS THROUGHOUT THE CONVEYOR

As illustrated in FIG. 2, when the conveyor 20 is used within a freezing enclosure 28 the air circulation pattern is highly efficient. The freezing air 58 travels in a relatively short, high velocity circuit which is transverse to the direction of conveyor motion. The freezing airflow 58, indicated by directional arrows, is drawn through the heat exchanger coils 60 by the fans 62 and driven through the top half 64 of conveyor tiers 30 and then back through the lower half 65. Horizontal longitudinal baffles 66 and 67 in conjunction with the interior surface structure 68 of the freezing enclosure 28 serve to direct the flow of freezing air 58. The heat exchanger coils 60 and fan 62 are mounted together on a supporting frame 70. There are very minimal losses of freezing air around the inlet 76 and exit 78 of the freezing enclosure 28 as shown on FIG. 1.

ARRANGEMENT OF THE CONVEYOR TO INCLUDE MULTIPLE LINEAR TIERS

Figure 4:
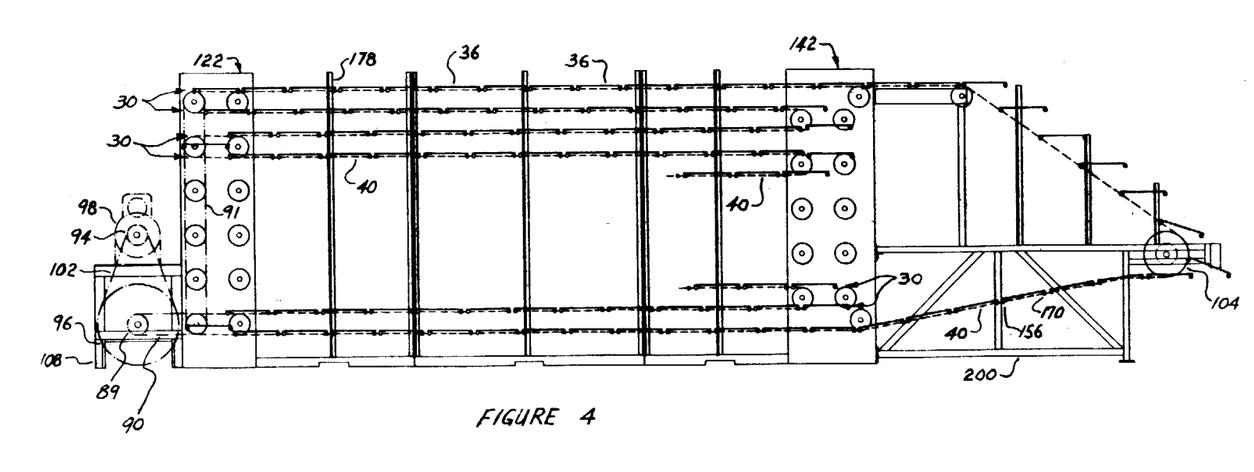

As best illustrated in FIG. 4, the conveyor 20 is arranged to include multiple linear tiers 30, one above the other. The trays 36 remain level throughout their travel at each tier 30. During transfer to the next tier, the trays are lowered by mechanisms which will be explained later and that continue to maintain the trays in a level position. This maintained level tray position allows the transport of a wide variety of products.

POWER DISTRIBUTION SYSTEM VIA SPROCKETS, CHAINS AND SHAFTS

In FIGS. 3, 4, 5 and 6, a specific preferred embodiment of the conveyor power assembly 80 is illustrated. All portions of the power assembly 80 are located within the designated enclosure 28. Due to this fact and that all drive components such as sprockets, chains and shafts are made of similar materials, i.e. carbon steel, the components possess the same coefficient of expansion and contraction. This feature assists the satisfactory operation of the conveyor 20.

Upon assembly of the conveyor 20 with its sprocket and chain drive system, the location and dimensions of the sprockets and chains determine inherently the overall characteristics of each embodiment of the conveyor 20.

Figure 5:
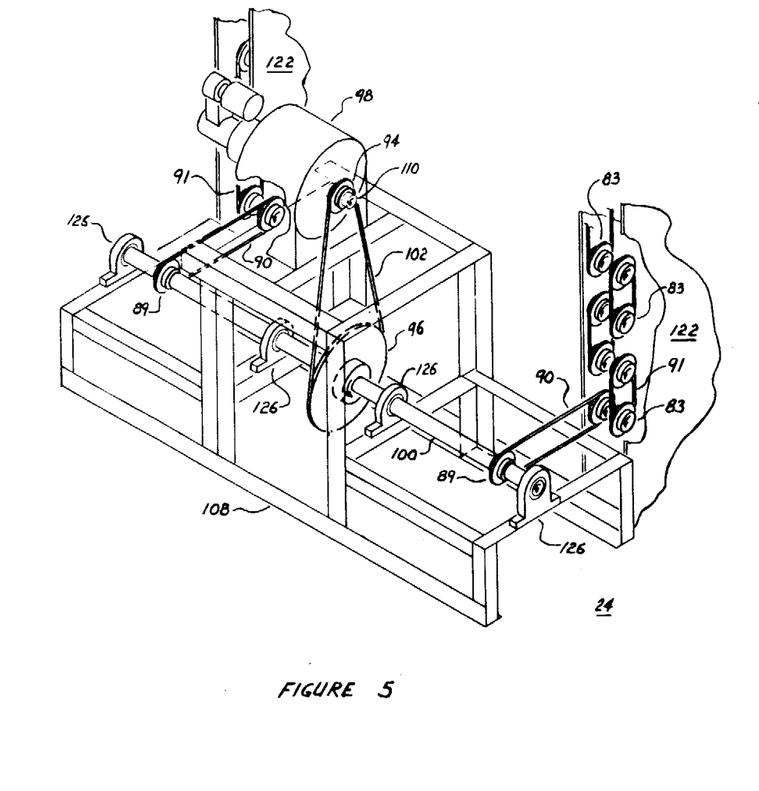
FIG. 5 is an isometric view of the conveyor driving mechanism, showing the gearmotor with its positive and synchronized power distribution to respective drive sprockets on each side of the conveyor and the subsequent transmission of power to the various tiers.

As illustrated in FIG. 5, a power assembly frame 108 positions a variable speed drive motor 98 well above the floor level 24 with its power shaft 110 arranged horizontally to receive the drive motor sprocket 94. This frame 108 also positions the main driveshaft 100 a sufficient distance below the drive motor 98 to accommodate the installation of the main driveshaft sprocket 96.

Motor drive chain 102 transmits rotary power from power shaft 110 and motor sprocket 94 to driveshaft sprocket 96 and driveshaft 100. Driveshaft 100 transmits this power through drive sprockets 89 and horizontal drive chains 90 to headstand drive sprockets 83. Bearings 126 secured to frame 108 support driveshaft 100.

Figure 6:
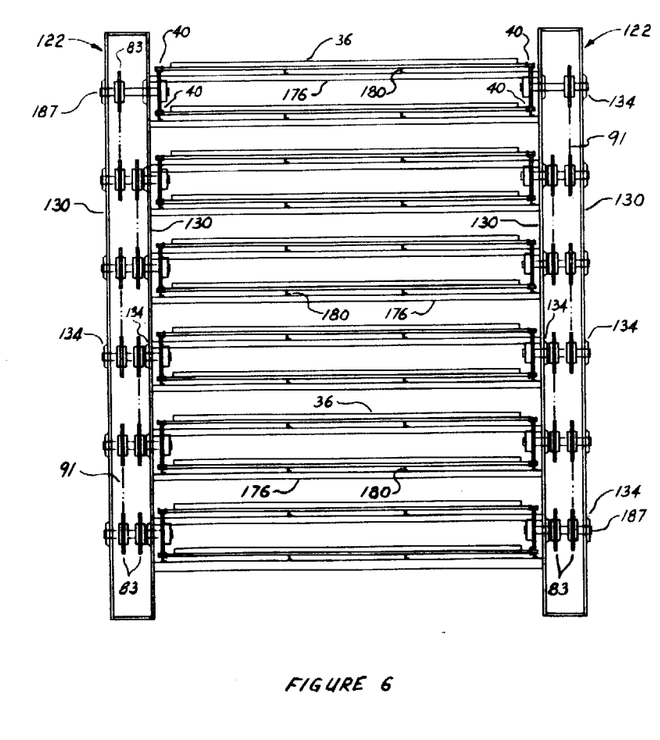
FIG. 6 is an end elevation schematic view of the headstand end indicating the overall synchronized power distribution to the various tiers via sprockets and drive chains. It also shows the tray supports.

This power is thereafter delivered upwardly and simultaneously on each side of conveyor 20 throughout the opposite sides of headstand 122 as particularly illustrated in FIG. 6. On each side the headstand 122 has vertical spaced walls 130 on which are mounted flange bearings 134. These bearings 134 rotatably support short shafts 187 on which are located paired drive sprockets 83. Vertical drive chains 91 are alternately positioned to transfer the power received at the lowest tier 30 upwardly to the various other horizontal tiers 30. As the short shafts 187 rotate simultaneously and synchronously, the sidechain drive sprockets are likewise rotated, thereby pulling the continuous dual sidechains 40 and causing the overall continuous linear chain conveyor to function.

Changes of conveyor speed are undertaken only by changing the speed of the drive motor 98. The speed changes of the drive motor 98 are transmitted immediately and synchronously throughout the continuously moving sidechains 40.

TRAY ATTACHMENT TO SIDECHAINS

Figure 7:
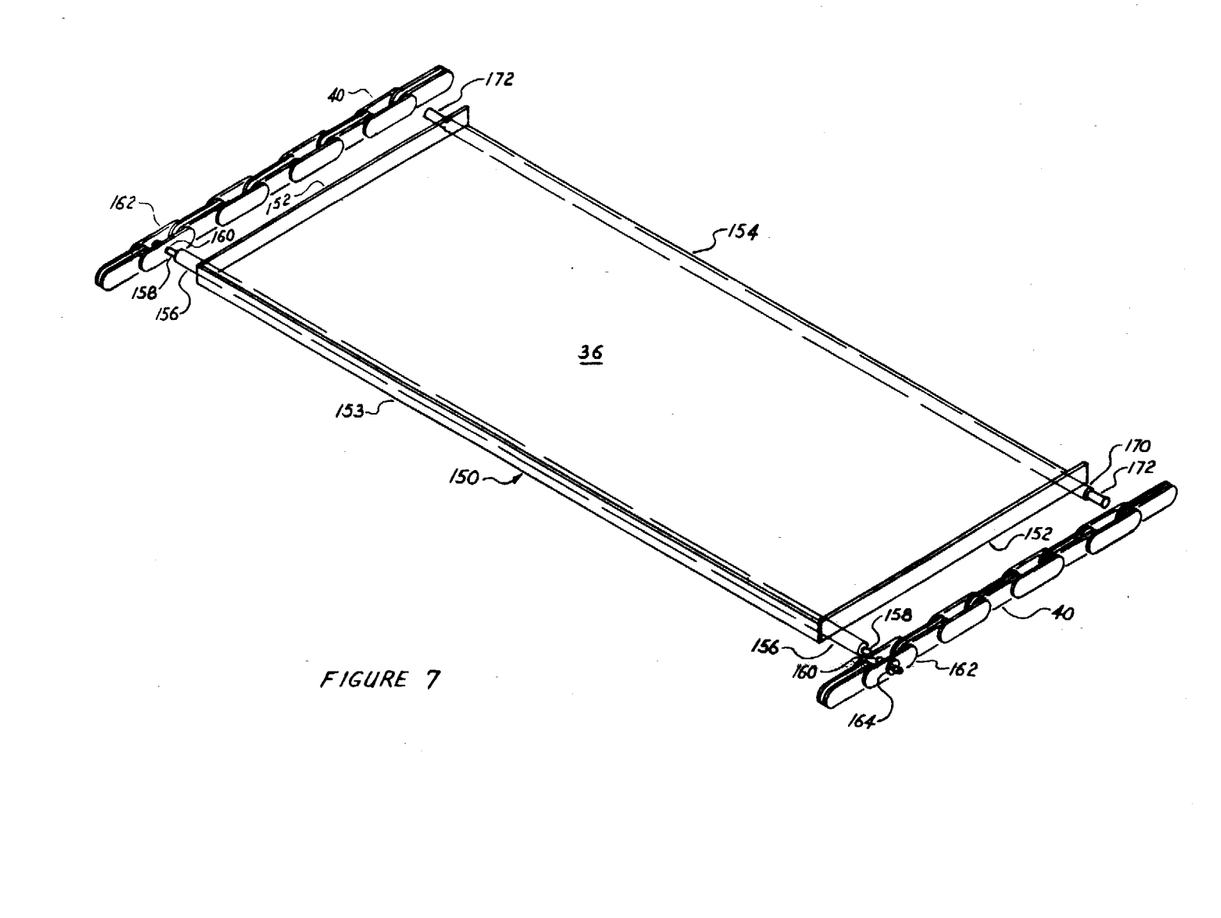
FIG. 7 is an isometric view of a tray, illustrating its three raised edges and one flush edge, and also indicating its transverse rod supports. One rod is secured at each end to opposite links of the dual continuous spaced sidechains and the other, shorter, rod is free at its ends for subsequent engagement by sprockets used to change the tier of the tray while keeping it level to support the product being processed.

As illustrated in FIG. 7, each tray assembly 150 includes the tray 36, crossrod 156, crossrod 170 and two attachment washers 164. The tray 36 has raised sides 152, a raised front edge 153, and a flush rear edge 154. The front of the tray 36 is attached to crossrod 156 which has reduced diameter ends 158 to pass through aligned holes 160 in opposite links 162 of the dual continuous spaced sidechains 40. The rod ends 158 are secured to the links 162 by welded washers 164. An alternate method of attachment not shown uses washers and cotter pins located in transverse holes in rod ends 158. The rear of the tray 36 is attached to crossrod 170 which is shorter than crossrod 156 and whose reduced diameter ends 172 are located between the dual spaced sidechains.

CONTROLLED LEVEL POSITION OF TRAYS

Figure 3:
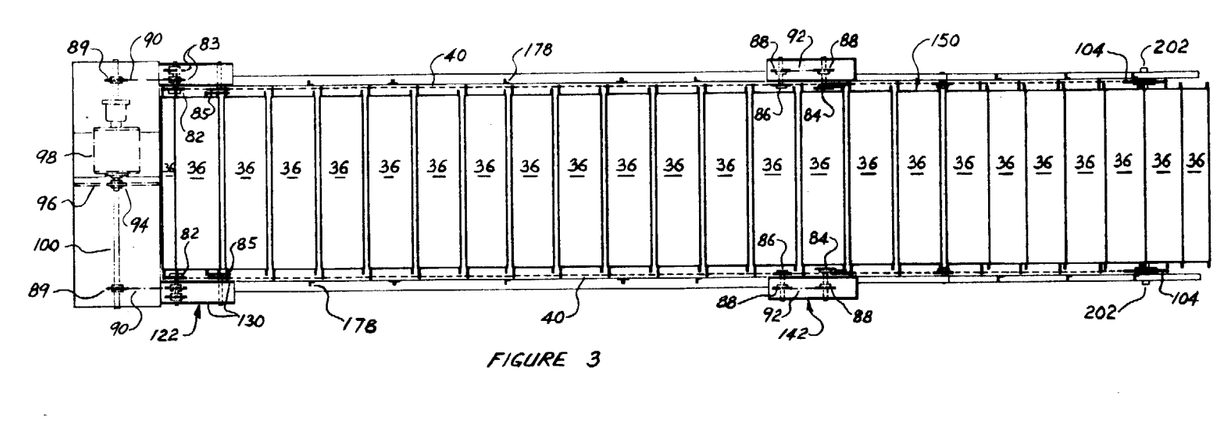
FIGS. 3 and 4 are respectively plan and side elevation schematic views of the conveyor system showing the pattern of tray movement, the driving mechanism at the headstand or drive end, and the loading and unloading section at the tailstand or load/unload end.

As shown in FIG. 6, transverse or cross-frame members 176 extend between vertical side frame members 178 illustrated in FIGS. 3 and 4. These frame members 176 at their spaced locations receive longitudinal supports or level guides 180. The trays 36, while being transported between the headstand 122 and tailstand 142 by virtue of their attachment to the continuously moving sidechains 40, are kept level as they slide along the level guides 180.

Figure 8:
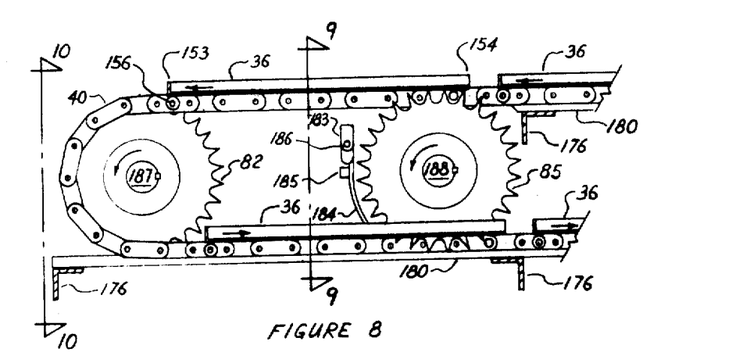
FIG. 8 is a partial side elevation sectional view showing how chains and sprockets carry the trays from one tier to the next lower tier while keeping them level.
Figure 9:
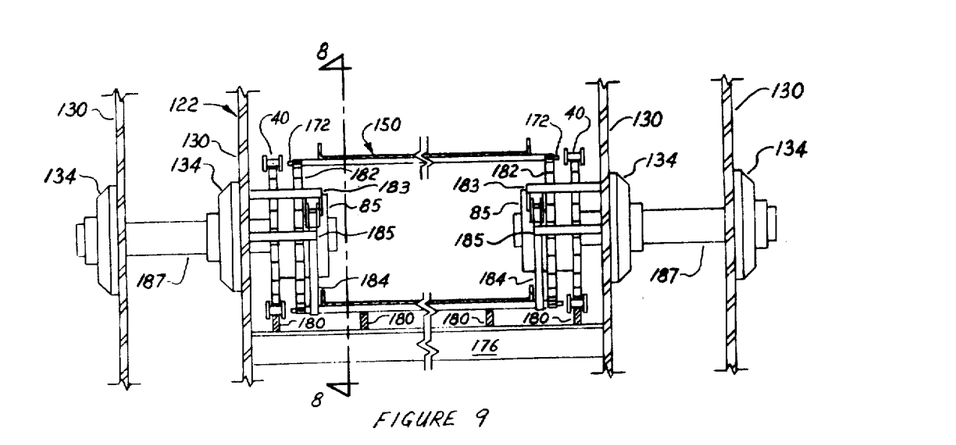
FIG. 9 is a partial end sectional view taken along section 9—9 of FIG. 8, showing how the free transverse rod tray support is lowered by a sprocket and ramp so that the tray remains level.
Figure 10:
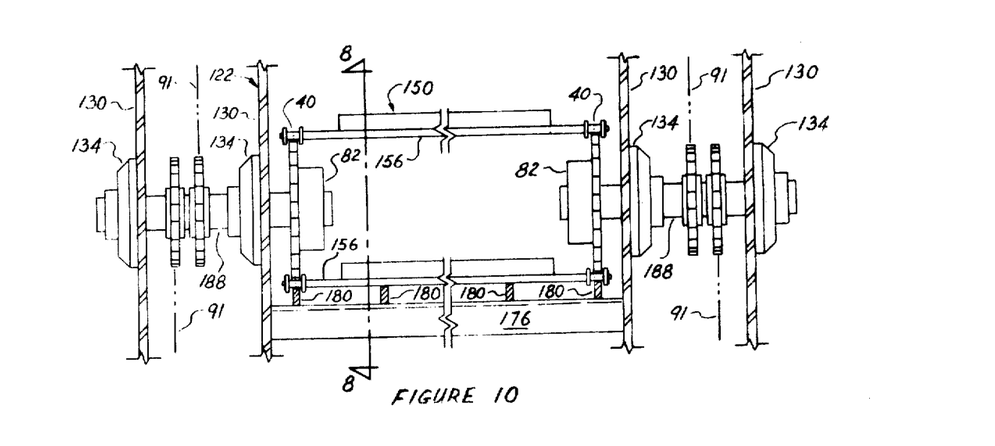
FIG. 10 is also a partial end sectional view but taken along section 10—10 of FIG. 8, illustrating how the transverse rod support that is secured to the sidechain links is lowered as the sidechains are driven by the drive sprockets located on each side of the headstand end.

At the headstand 122, as illustrated in FIGS. 8, 9 and 10, the front tray edge 153 which is fastened to crossrod 156 which, in turn, is attached to sidechains 40, is lowered as the chain passes around the sidechain drive sprockets 82. The rear tray edge 154 which is attached to the free crossrod 170 is lowered at the same time as crossrod 170 meshes with the inside sprocket teeth 182 of double transfer sprockets 85. Guide ramps 184 pivotally mounted to the headstand 122 by pivots 186 and supports 183 keep the shorter reduced diameter ends 172 of free crossrod 170 in contact with the inside sprocket teeth 182 of the double transfer sprockets 85. The tray assembly 150 is thusly lowered to the next linear tier 30 while remaining perfectly level. Correct timing is obtained by the sidechains 40 rotating the double transfer sprockets 85 at the same speed as the sidechain drive sprockets 82. As the tray assembly 150 progresses in the new direction, guide ramps 184 pivot about pins 186 to allow crossrod 156 to pass underneath. Guide ramp stops 185 correctly re-position the guide ramps 184.

Figure 11:
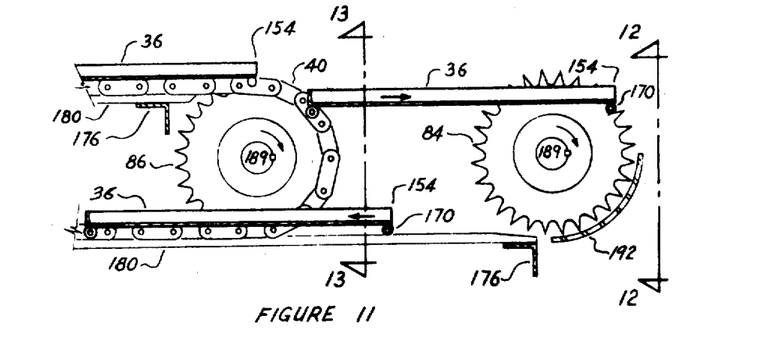
FIGS. 11, 12 and 13 illustrate the different but similar tray lowering mechanism at the tailstand end of the conveyor.
Figure 12:
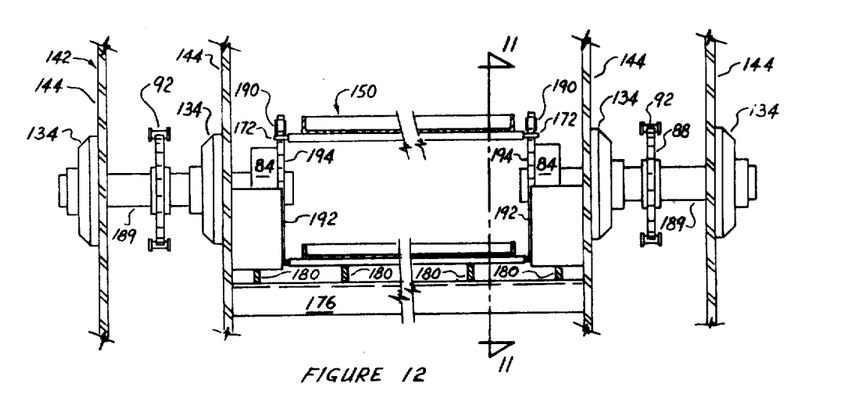
Figure 13:
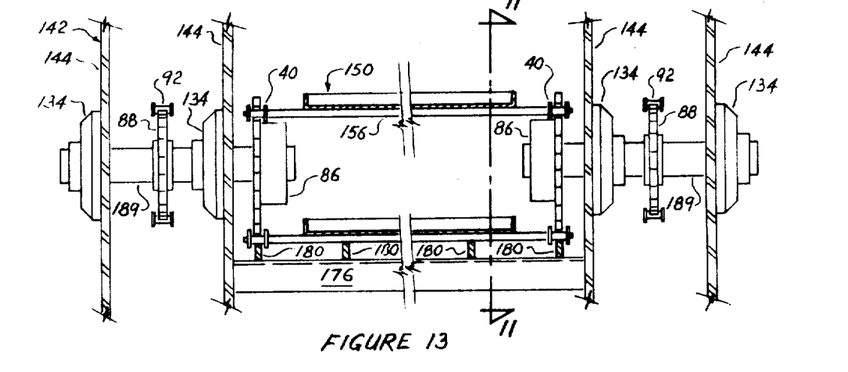

At the tailstand 142, as shown in FIGS. 11, 12 and 13, the leading tray edge, which in reality is the rear tray edge 154, and its crossrod 170 leaves the spaced longitudinal supports 180 and is then supported by short guides 190 until the reduced diameter ends 172 are intercepted by crossrod transfer sprockets 84. At this moment, tray crossrod 156 is engaging sidechain idler sprockets 86. Meanwhile, timing sprockets 88 and timing chains 92, attached to shafts 189, cause these shafts 189 to rotate with equal speed and thereby lower the tray assembly 150 while keeping it level. Stationary guide ramps 192 insure the crossrod ends 172 will continue their contact with the sprocket teeth 194 of crossrod transfer sprockets 84.

LOADING AND UNLOADING OF CONVEYOR

Figure 14:
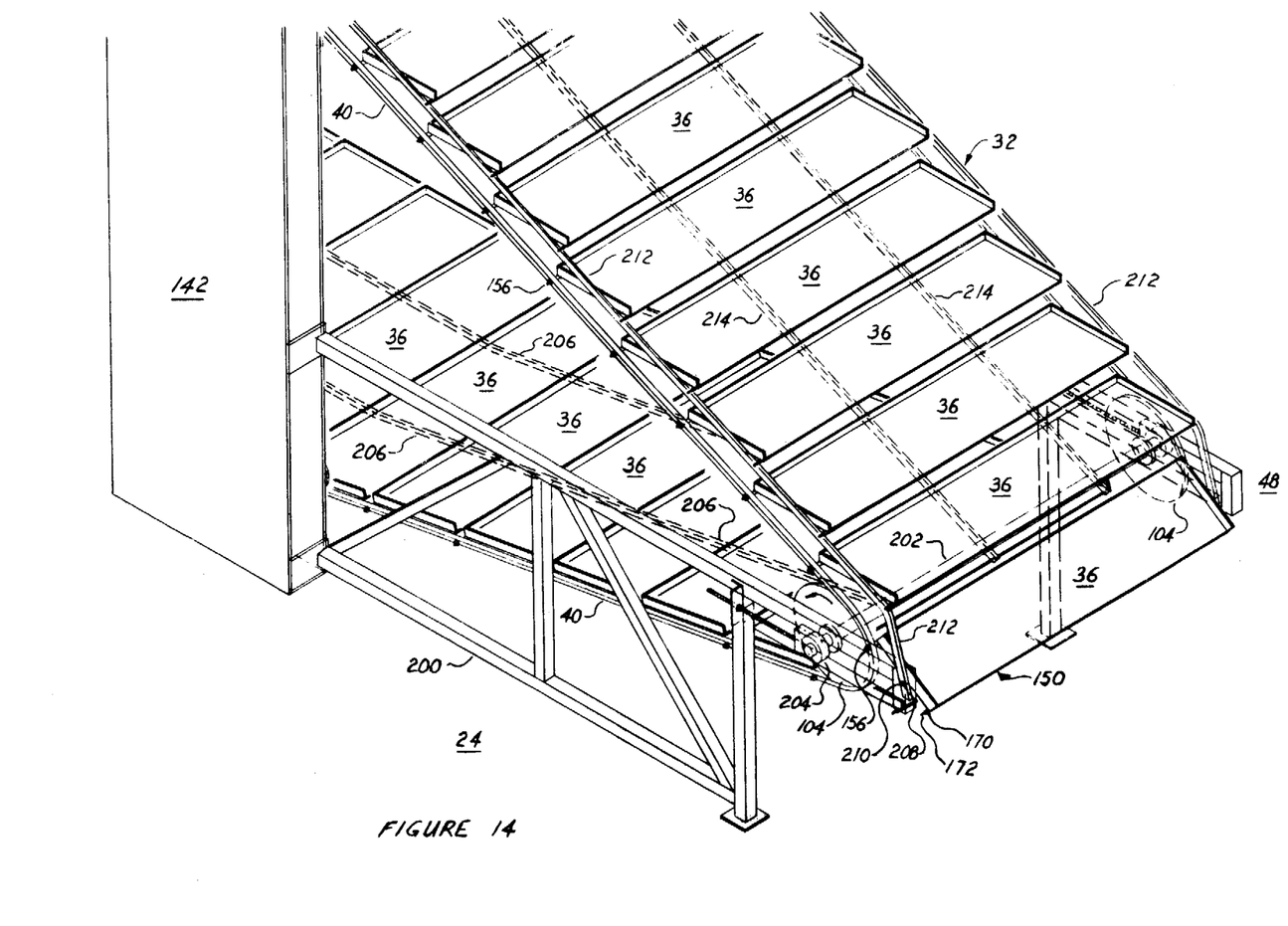
FIG. 14 is a partial isometric view of the loading and unloading section of the chain conveyor system showing how the trays are inclined to discharge the product and then guided to a level position for loading.

As illustrated in FIGS. 1, 3, 4 and particularly FIG. 14, the loading and unloading of a product 42 is conveniently undertaken outside of the retention time designated volume 28. This location of the loading and unloading section 32 of the conveyor 20 enables persons 50 working here to be in area 34 of normal room temperature.

A framework 200 mounted on the floor 24 supports the loading and unloading section 32. The take-up sprockets 104 with their shaft 202 and bearings 204 are mounted on frame 200 to be horizontally adjustable and make small corrections to keep the sidechains 40 properly tightened.

The tray assemblies 150 loaded with product 42 upon leaving the exit 78 of the designated volume 28 are guided upwardly on a very gradual incline until reaching the discharge locale 48. During this travel, the trays 36 are actually being pushed by means of their crossrod 156 attached to the chain links 162 until crossrod 170, which is at the leading edge of travel, is no longer supported by spaced supports 206. As the tray assemblies 150 are pivotally secured at the crossrods 156 to the sidechain links 162, the trays 36 are caused to incline downwardly, thereby allowing the product 42 to slide off. Preferably the product 42 will be discharged to a removal conveyor 48.

Shortly before the transverse tray crossrod 170 reaches the end of the support 206, the rod ends 172 contact rod supports 208. By means of pivots 210 the rod supports 208 move upwardly, allowing rod ends 172 to pass beneath. As the tray assembly 150 reverses direction, it begins a gradually inclined climb and becomes level once again as transverse crossrods 170 are guided first on rod supports 208 and then spaced supports 212 while crossrods 156 are supported on spaced supports 214.

After the point where the trays become level and before the entrance to the enclosure 28, the conveyor may be loaded from a source such as a loading conveyor 46.

I claim:

1. A continuous positive travel essentially linear like path dual spaced chain conveyor and temperature treatment system, utilizing essentially standard components of like coefficients of expansion and contraction, operating throughout multiple horizontal tiers to transport on identical horizontally supported movable trays except for possible products discharge, products which are being either cooled, frozen, warmed, heated, or dried, during a retention time within the enclosure, comprising:

(a) a large temperature treatment enclosure with an access end wall, having an air circulation system, (b) a long supporting frame having multiple vertical spaced horizontal linear tier frame components disposed within the enclosure, (c) a pair of transversely oppositely spaced uniformly driven chain sprockets arranged at each end of each horizontal linear tier of the conveyor, being mounted on shafts rotatably supported on bearings secured to the supporting frame, (d) a cooperating transversely oppositely spaced standard idler chain sprocket which matches each driven chain sprocket and is longitudinally spaced a short distance from the driven sprockets at the end of each horizontal linear tier of the conveyor, the idler sprockets also being mounted on shafts rotatably supported on bearings secured to the supporting frame and driven at the same speed as the driven chain sprockets, (e) continuous positive travel essentially linear like path dual spaced chain drive assembly with a chain at each side of the frame, each of which extends throughout the multiple tiers and respectively passes around all of the driven chain sprockets on that one side of the tier, (f) multiple, spaced trays pivotally secured at a pivot connection at one of their corner ends on each side to the respective opposite links of the continuous dual spaced chains and at their other corner ends having a cross rod end to engage the idler sprockets, (g) a horizontal longitudinal slide on support secured to and extending along the supporting frame at each tier to keep the trays level during their linear travel along their respective tier, (h) the idler chain sprockets being mounted in horizontal alignment and longitudinally spaced from the driven chain sprockets by a distance equal to the dimension between the tray pivot connection and the cross rod end, (i) the enclosure end wall being positioned close to the supporting frame and having a first horizontal opening adjacent the uppermost tier and a second horizontal opening adjacent the lowermost tier for permitting the dual spaced chains and their associated trays to pass therethrough, (j) a pair of take-up sprockets located outside the end wall of the enclosure and aligned with the drive and idler sprockets and around which the dual chains pass and which constitute the loading and unloading portion of the conveyor system, (k) the idler chain sprockets of each tier adjacent the end wall being closer to the end wall and disposed outside of the driven chain sprocket while the idler chain sprockets at the other end of the tiers are disposed inside the driven chain sprockets, (l) the pivoted end of each of the trays being disposed further away from the end wall when such trays are within the enclosure, so that such trays can pivot downwardly to unload when the tray pass through the second opening in the end wall, and (m) support means associated with each idler sprocket, and with the exterior portion of the dual spaced chains for supporting the tray horizontally when moving from one elevation to another.

2. A continuous linear chain conveyor system, as claimed in claim 1, comprising, in addition, a driving mechanism to supply rotative power, via sprockets, chains and shafts mounted on bearings secured to the supporting frame, both to the transversely spaced driven sprockets driving the chains, and to the additional transversely spaced sprockets of the auxiliary like timed like standard chain drive and sprocket sub assemblies, transferring the respective ends of each tray from one linear tier to another linear tier while the trays remain level.

3. A continuous linear chain conveyor system, as claimed in claim 2, comprising in addition, pivotal arcuate guide ramps to also guide the ends of the trays which are being transferred from one linear tier to another linear tier of the conveyor by the additional sprockets.

4. A continuous linear chain conveyor system, as claimed in claims 1, 2 and 3, comprising in addition, a loading and unloading portion of the conveyor, comprising in turn:

(a) an extended frame continuing the supporting frame;

(b) additional lengths of the continuous dual spaced chains;

(c) additional trays pivotally secured to the additional lengths of the chains;

(d) transversely spaced takeup sprockets supported on the extended frame via shafts and flanged bearings, serving to direct the extended dual spaced continuous chains in their transfer between the bottom and top linear tiers of the conveyor; and (e) longitudinal supports secured to the extended frame to keep the trays level during their transfer between the bottom and top linear tiers of the conveyor.

5. A continuous linear chain conveyor system, as claimed in claim 4, comprising shortened longitudinal supports secured to the extended frame, in lieu of the longer longitudinal supports, to create a clearance at a locale so the tray ends not secured to the links of the chains will tip downwardly allowing a product being carried thereon to slide off, at the conclusion of the product's conveyor travel.

6. A continuous linear chain conveyor system, as claimed in claim 3, wherein the auxiliary like timed like standard chain drive and sprocket sub assemblies are composed of timing chains and their respective timed driven sprockets which are mounted on shafts rotatably supported on bearings secured to the supporting frame with shafts of these timed driven sprockets being common to the pair of additional transversely spaced sprockets, which transfer the other ends not connected to the chains of the multiple spaced trays from one linear tier to another, while the trays remain level.

7. A continuous linear chain conveyor system, as claimed in claim 6, wherein each of the multiple trays has a crossrod secured to one tray end and this crossrod is used in pivotally securing the tray to the respective opposite links of the continuous dual spaced chains, and each of the multiple trays has another crossrod shorter in length, secured to the other tray end, and the ends of the shorter crossrod are transferred by the respective pairs of the additional transversely spaced sprockets, in transferring the other ends of the multiple spaced trays from one linear tier to another, while the trays remain level.

8. A continuous linear chain conveyor system, as claimed in claim 5, wherein the auxiliary like timed standard chain drive and sprocket subassemblies are composed of timing chains and their respective timed driven sprockets which are mounted on shafts rotatably supported on bearings secured to the supporting frame, and are driven by the driving mechanism, with the shafts of these timed driven sprockets being common to a pair of the additional transversely spaced sprockets, which transfer the other ends of the multiple spaced trays from one linear tier to another, while the trays remain level.

9. A continuous linear chain conveyor system, as claimed in claim 8, wherein each of the multiple trays has a crossrod secured to one tray end and this crossrod is used in pivotally securing the tray to the respective opposite links of the continuous dual spaced chains, and each of the multiple trays has another crossrod shorter in length, secured to the other tray end, and the ends of the shorter crossrod are transferred by the respective pairs of the additional transversely spaced sprockets, in transferring the other ends of the multiple spaced trays from one linear tier to another, while the trays remain level.

10. A continuous linear chain conveyor system, as claimed in claim 5, wherein a freezing air circulation assembly is installed into the designated volume structure to direct freezing air transversely to the direction of the continuous linear chain conveyor.

11. A continuous linear chain conveyor system, as claimed in claim 10, wherein the freezing air circulation assembly directs the freezing air transversely through the top group of conveyor tiers and redirects the freezing air transversely back through the bottom group of conveyor tiers.

12. A continuous linear chain conveyor system, as claimed in claim 4, wherein a freezing air circulation assembly is installed into the designated volume structure to direct freezing air transversely to the direction of the continuous linear chain conveyor.

13. A continuous linear conveyor system, as claimed in claim 12, wherein the freezing air circulation assembly directs the freezing air transversely through the top group of conveyor tiers and redirects the freezing air transversely back through the bottom group of conveyor tiers.

* * * * *